May 30, 1944.  O. L. STARR  2,349,918
PISTON CONSTRUCTION
Filed July 8, 1940  2 Sheets-Sheet 1
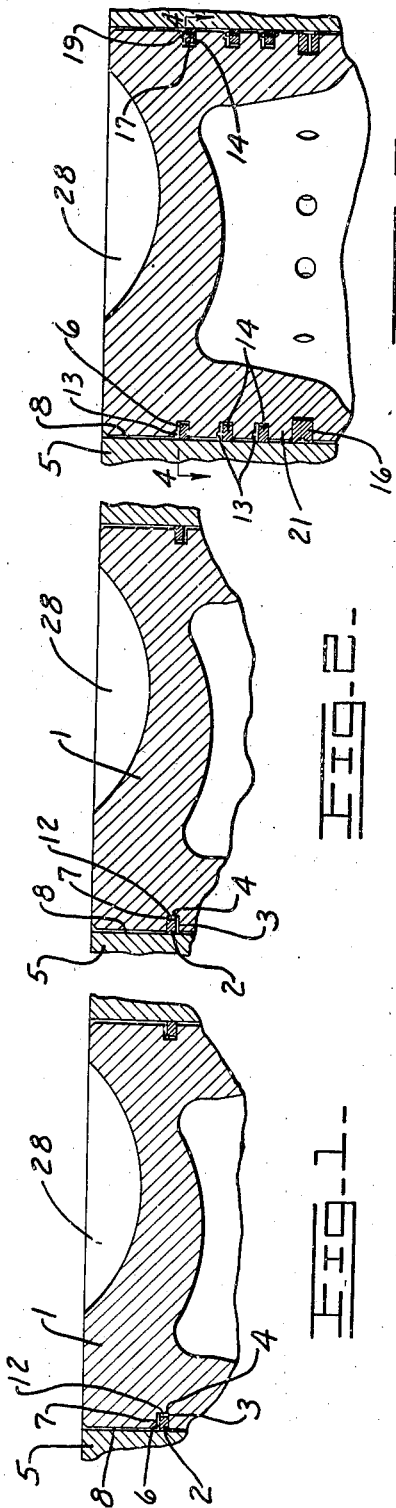
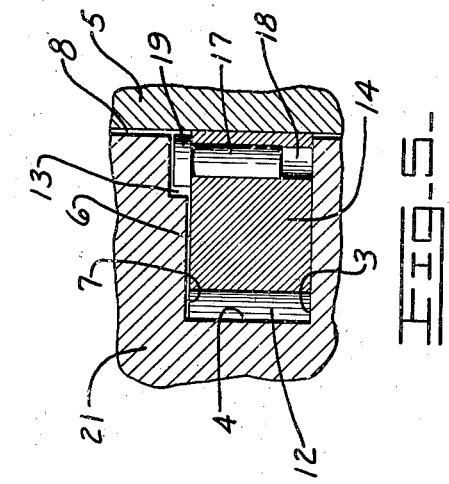
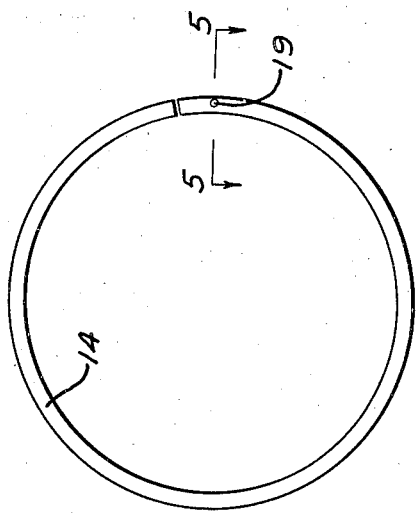
INVENTOR.
Oscar L. Starr
BY
Charles M. Finger
ATTORNEY.

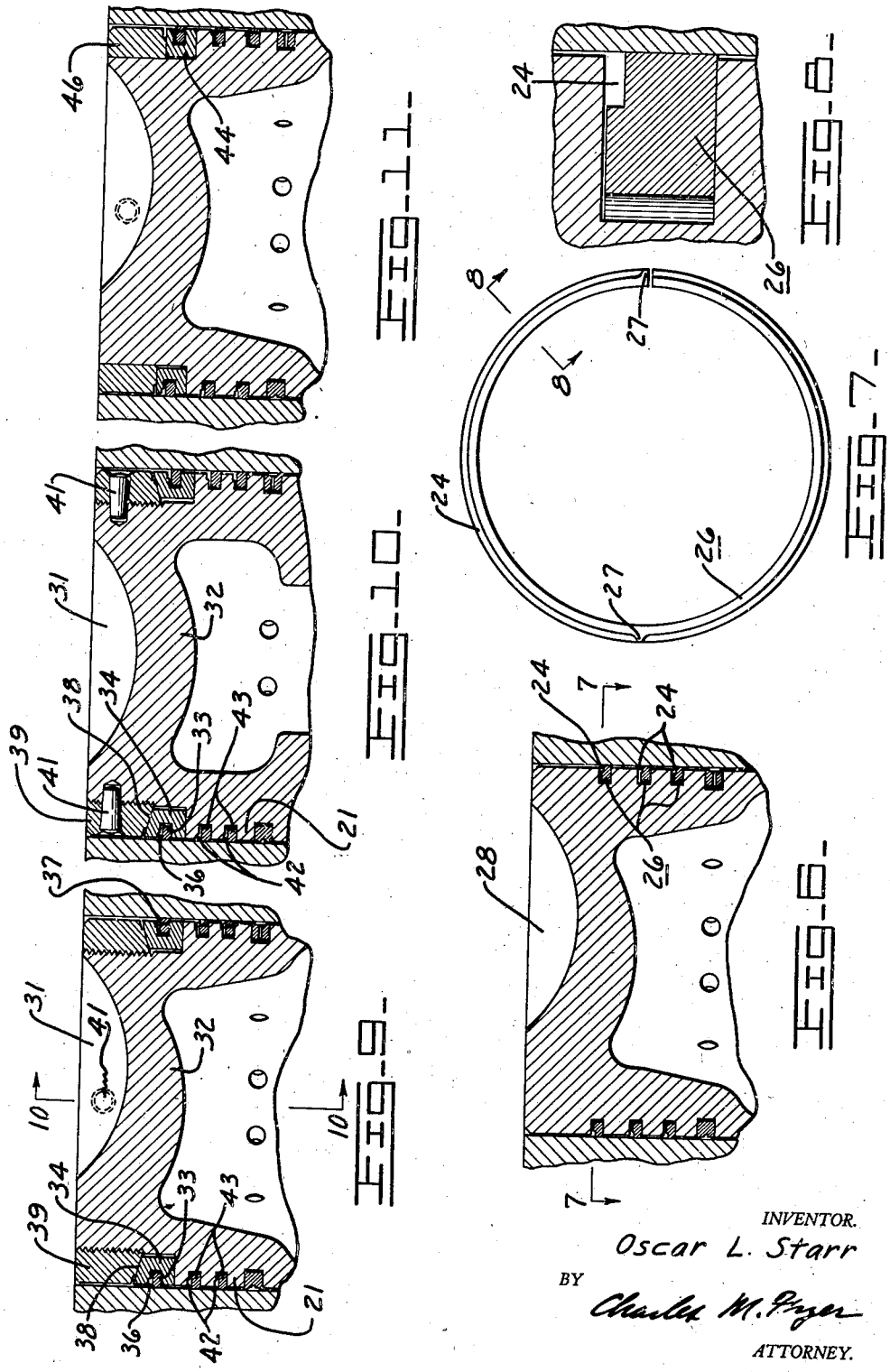

Patented May 30, 1944

2,349,918

UNITED STATES PATENT OFFICE 2,349,918

PISTON CONSTRUCTION

Oscar L. Starr, Mission San Jose, Calif., assignor to Caterpillar Tractor Co., San Leandro, Calif., a corporation of California Application July 8, 1940, Serial No. 344,305

3 Claims. (Cl. 309—31)

My invention relates to pistons, and more particularly to means for minimizing blow-by past a piston working in an internal combustion engine.

In the following description, the terms "upper" and "lower" are employed to designate various elements of the piston construction, with reference to the crown of the piston which I have considered the top, irrespective of how the piston is adapted to be positioned, as determined by the type of engine in which it is adapted to be employed.

My investigation of the problem of blow-by past a piston ring of an internal combustion engine piston, leads me to believe that the following are some of the factors that are involved in such problem. During the compression stroke of a piston, the forces resulting from upward movement of the piston and drag of a piston ring against the cylinder wall, tend to cause the piston ring to be maintained seated on the lower side of the groove in which the ring is mounted. This allows the pressure of gas in the cylinder of the engine to pass between the upper side of the piston ring and the upper side of the ring groove, and into the space in back of the ring to thus cause the ring to be expanded outwardly by such pressure into efficacious sealing contact with the wall of the cylinder. Since the ring is thus sealed against the lower side of the ring groove and sealed against the cylinder wall by the pressure in back of the ring, blow-by past the ring is at a minimum.

However, when the upper dead center position of the piston is reached and the piston is about to commence its return or working stroke, the inertia of the piston ring resulting from change in travel of the piston, may cause at least a portion thereof, if not the entire ring, to leave the lower side of its groove and seal against the upper side of such groove. This is especially so with respect to the adjacent free end portions of the ring. Also, should the ring be warped, so that under normal conditions, it does not contact evenly the lower side of its seating groove, the warped portions of the ring may leave the lower side of the ring groove and seal against the upper side of such groove.

Such leaving of the ring, or any portion thereof, from the lower side of the ring groove and consequent seating against the upper side of the groove, causes at least some of the space in back of the ring to be sealed against quick access to material gas pressure by virtue of the sealing contact between the upper side of the ring and the upper side of its groove. As a result, the ring collapses, fluttering occurs and pressure escapes between the outer peripheral sealing face of the ring and the cylinder wall, resulting in loss of compression or blow-by. Also, a warped ring by itself may result in blow-by because communication may be established between the sides of the ring adjacent the sides of its seating groove, and the space in back of the ring. Sealing of the space in back of the piston ring against access to cylinder pressure tends to occur during the entire return or working stroke of the piston, because then the forces resulting from movement of the piston and drag of the piston ring against the cylinder wall, tend to cause the upper side of the piston ring to seal against the upper side of its groove; and this precludes enough pressure from acting in back of the ring to maintain it expanded in sealing contact with the cylinder wall.

My invention has as its object, among others, the provision of improved means in a piston construction for materially minimizing, if not entirely precluding, the above-described blow-by. Other objects of my invention will become apparent from a perusal of the following description thereof.

In general, for minimizing such blow-by, I provide a recess, preferably in the form of a substantially uninterrupted or continuous channel, adjacent the upper side of a piston ring groove, to expose sufficient area of the ring to cylinder pressure and thereby cause such pressure to urge the ring completely in sealing engagement with the lower side of its groove. This allows such pressure to enter, and be confined and concentrated in the groove in back of the piston ring, and thus maintain the ring uniformly expanded in peripheral sealing contact with the cylinder wall. Preferably, the ring grove is designed to seat the ring with minimum clearance between the sides thereof, and with minimum space in back of the ring, for decreasing the volume in such spaces and thereby provide for maximum pressure to act quickly against the ring. Such channel is preferably formed in the upper side of the piston ring groove itself, but it may be formed in the upper side of the piston ring adapted to be mounted in such groove. Although a substantially continuous or uninterrupted channel is preferred, the same effect may be obtained by a plurality of peripherally spaced recesses or notches in the upper side of the ring groove or in the upper side of the piston ring, but such arrangement is not as desirable. Means is preferably employed in association with the channel to remove carbon deposit which tends to accumulate therein, so as to maintain the channel open.

Reference is now made to the drawings for a more detailed description of preferred forms of my invention. In such drawings, the spacing between a piston and a cylinder wall; the width of the piston ring groove with reference to the width of a piston ring; the radial depth of such groove; and the size of my blow-by minimizing channel are exaggerated for purposes of illustration, because such distances are usually so small as to preclude clear illustration thereof on drawings of ordinary scale.

Fig. 1 is a fragmentary vertical sectional view of a piston in a cylinder, illustrating the location of a piston ring in its groove just prior to the time the piston reaches top dead center, resulting from the forces created by upward movement of the piston.

Fig. 2 is a fragmentary vertical sectional view, similar to Fig. 1, illustrating how the piston ring, or a portion thereof, may be caused to seal against the upper side of its groove due to inertia, just after the piston has reached top dead center.

In Figs. 1 and 2, the feature of my invention is not illustrated; the figures being merely presented to facilitate understanding of my invention.

Fig. 3 is a fragmentary vertical sectional view through a piston and cylinder, illustrating the feature of my invention employed therein.

Fig. 4 is a top plan view of a piston ring which I preferably employ, taken in a plane indicated by line 4—4 in Fig. 3.

Fig. 5 is an enlarged vertical sectional view illustrating a piston ring seated in its groove, in association with the feature of my invention; the plane of such section being indicated by line 5—5 in Fig. 4.

Fig. 6 is a fragmentary vertical sectional view, similar to Fig. 3, of a modified form of construction wherein the feature of my invention is employed in the piston ring.

Fig. 7 is a plan view of the piston ring employed in the construction of Fig. 6, taken in a plane indicated by line 7—7 in Fig. 6.

Fig. 8 is an enlarged fragmentary vertical sectional view, similar to Fig. 5; the plane of the section being indicated by line 8—8 in Fig. 7.

Fig. 9 is a fragmentary vertical sectional view of a preferred form of piston of my invention.

Fig. 10 is a section taken in a plane indicated by line 10—10 in Fig. 9.

Fig. 11 is a fragmentary vertical sectional view of a modified form of construction, somewhat similar to the construction of Figs. 9 and 10.

As is illustrated in Fig. 1, during the compression stroke of a piston 1 and just before it reaches top dead center, the piston ring 2 is maintained in contact with the lower side 3 of peripheral piston ring groove 4 by the forces resulting from upward movement of the piston and drag of ring 2 against the cylinder wall 5. This leaves a clear space 6 between the upper side of ring 2 and the upper side 7 of groove 4. As a result, cylinder pressure in the space 8 between cylinder wall 5 and piston 1, can act or enter through space 6, and into the space 12 behind the piston ring 2. Such pressure causes the peripheral face of ring 2 to be expanded into sealing engagement with the cylinder wall, to thereby present no problem of blow-by.

However, when the piston momentarily stops at top dead center, the inertia of the ring may cause at least a portion thereof, if not the entire ring, to continue its upward movement; and its upper side or a portion thereof, then seals against upper side 7 of groove 4, as is illustrated in Fig. 2. The space 8 between the piston and the cylinder wall is not sufficient to expose sufficient peripheral area on the upper side of the piston ring 2 to allow the cylinder pressure to cause the entire ring to remain seated against the lower side 3 of ring groove 4. As a result, should a substantial portion of the ring seal against the upper side 7 of groove 4, such pressure can not enter past the portion of the ring thus sealed against the upper side, into space 12 behind the ring to maintain such portion of the ring expanded in sealing contact with cylinder wall 5, and the ring collapses causing the objectionable blow-by. Furthermore, if a portion of the ring should seal against the upper side and another portion against the lower side, then pressure can escape past the ring through space 12 behind it, which will result in collapsing of the ring. A warped ring will produce the latter effect.

After recognizing such phenomena, I solved the described blow-by problem, by providing a substantially uninterrupted peripheral recess or channel 13, rectangularly shaped in cross-section, in the upper side 7 of piston ring groove 4, as is illustrated in Fig. 3, and on a larger scale in Fig. 5. With reference to Fig. 5, it will be noted that should the piston ring 14 or any portion thereof tend to seal against the upper side 7 of groove 4, as a result of the forces referred to or because of warpage of the ring, channel 13 provides sufficient space to expose a material peripheral area on the upper side of piston ring 14, to cylinder pressure in space 8 between the piston and the cylinder wall. As a result, the cylinder pressure can always act against the upper side of the piston ring to urge substantially its entire lower side to remain seated and sealed on the lower side 3 of piston ring groove 4; and such pressure can hence always enter between the ring 14 and upper groove side 7, into space 12 in back of the ring to expand it, and maintain uniform sealing engagement with the cylinder wall. Thus, blow-by is materially reduced, if not entirely eliminated.

It is to be noted that the piston ring is rectangularly shaped in cross-section with its lower and upper sides substantially parallel, and each in a plane substantially normal or at a right angle with respect to the piston axis. Also, the lower side 3 and the upper side 7 of the ring groove are substantially parallel to each other, and to the upper and lower sides of the ring, so that they too are each substantially normal or at a right angle with respect to the piston axis. Such arrangement, in addition to making for economy of manufacture because it permits a conventional shape of ring and ring groove, is advantageous in insuring proper sealing contact between the desired ring and groove surfaces, and between the periphery of the ring and the cylinder wall. This is so, because as the piston contracts and expands by virtue of changes in temperature, there is less distortion than would otherwise be the case should the surfaces under discussion be at an oblique angle to the axis of the piston, or non-parallel, or both. Furthermore, the arrangement of recess 13 is such as to enable uninterrupted sealing contact to occur between the inner portion of the upper side of the ring and the upper side 7 of the ring groove during the intake stroke of the piston. This is important because during such cycle, the piston moves downwardly, and the forces are such as to cause the upper side of the piston ring to engage the upper side of its groove. Therefore, in order to obtain an efficient oil tight seal during such cycle, it is necessary that there be no space between the upper side of the ring and the upper side of its groove, which establishes communication between the outer periphery of the ring and the clearance space behind the ring.

The piston illustrated in Fig. 3 has a blow-by minimizing channel or recess 13 for each of the compression rings, the primary function of which is to maintain a pressure seal with the cylinder wall. The lowermost ring 16 in Fig. 3 is an oil ring, and, therefore, the blow-by minimizing means of my invention is not employed therewith. Although the blow-by minimizing means is employed with each of the compression rings in the construction of Fig. 3, it may be omitted in association with some of them if so desired. However, the top compression ring should always have in association therewith, the described blow-by minimizing means if blow-by is to be obviated in accordance with the teachings of my invention.

Blow-by minimizing channel 13 may be employed alone and be efficient in minimizing blow-by as long as it does not become plugged up by carbon deposit, which forms in the course of time. To maintain such channel free of carbon deposit, I preferably employ means in association therewith for removing carbon from the channel to maintain it open continuously. As can be seen more clearly in Fig. 5, such means, preferably, comprises a pin 17 press-fitted in an aperture 18 near the periphery of piston ring 14, and having head 19 projecting into channel 13 when the piston ring is assembled on the piston. During working operation of a piston in an engine, the piston rings have rotational movement in their seating grooves; and consequently there is relative movement between the piston and its rings. Hence, as ring 14 rotates relative to the piston, pin 17 being fixed to the ring will cause head 19 thereon to clean out carbon which tends to deposit in channel 13.

Because of the high pressures which exist in the cylinder of an internal combustion engine at the commencement of the working stroke of a piston, particularly in a compression ignition (Diesel) engine wherein my invention is now employed, the blow-by minimizing channel 13 need not be particularly large, although it may appear so from the drawings which, as previously explained, exaggerate the size of such channel in order to illustrate clearly the invention. The size of such channel and the clearances or spaces associated therewith may vary widely. However, as previously related, it is desirable to have the ring fit with minimum clearance between the sides of its seating groove and to have the space 12 behind the ring as small as is practically possible, to thereby present a minimum volume in which the cylinder pressure can enter and hence obtain a high pressure to act quickly in both sealing the ring against the lower side of its seating groove and in expanding the ring in sealing contact with the cylinder wall. A small space 12 behind the ring is also desirable to preclude partial combustion in such space and thereby minimize carbon deposit, which if it occurs to any great extent might result in plugging of such space with consequent loss in effectiveness of the blow-by minimizing means of my invention.

Figs. 6 through 8 illustrate a modified form of construction in which a blow-by minimizing channel 24 is formed in the periphery of the upper side of a piston ring 26, instead of in the upper side of its groove. As can be seen from Fig. 7, such channel 24 is interrupted by projections 27 which serve the same purpose as carbon cleaning member 19, although not as efficiently, because projections 27 form an integral part of the member in which the channel is formed. Therefore, there is no relative movement between such projections and the channel; while on the other hand, relative movement occurs between member 19 and channel 13. Channel 24 functions in the same way as the previously described channel 13.

Where the blow-by minimizing channel is formed in the periphery of the upper side of the ring groove instead of in the ring, this provides the advantage of a full bearing face on the outer periphery of the ring against the cylinder wall. Thus, for any given radial pressure thrusting the ring outwardly, the pressure per unit area between the outer peripheral face of the ring and the cylinder wall will be less, compared to formation of such channel in the periphery of the upper side of the ring itself, where the rings are of the same size and are seated in grooves of the same size. As a result, the preferred construction of the blow-by minimizing channel in the upper side of the ring groove, minimizes wear or scoring of the cylinder wall. In this connection, it is to be noted that blow-by minimizing channel 24 of Figs. 6 through 8 is of materially less height than the height of the ring itself, being less than one-fourth of the height of the ring, so as not to unduly increase the pressure per unit area between the outer peripheral face of the ring and the cylinder wall.

In Figs. 1 through 8, the piston crowns are shown formed with a combustion crater 28; such crater having particular applicability in a type of compression ignition (Diesel) engine wherein the piston of my invention is employed. It is to be understood, however, that the principle of my invention is applicable in pistons for any type of engines, whether formed with a combustion crater in the crown thereof or flat crowned.

Figs. 9 and 10 illustrate an actual piston construction with which the feature of the present invention is employed. Such construction is described more specifically and claimed in my copending applications Serial Number 344,304, filed July 8, 1940, for "Piston," and Serial Number 344,306, filed July 8, 1940, for "Fitting of members." Briefly, the piston is of aluminum and its crown is provided with an off-set spherically shaped combustion crater 31, the under wall 32 of which is tapered to effect uniform flow of heat to the periphery of the piston. The top compression ring 33 is seated in an independent one piece or integral ring groove band 34 of wear resistant metal harder than the body of the piston, such as cast iron, which forms part of the piston when assembled thereon, and which is provided with blow-by minimizing channel 36; a carbon removing member 37 being fixed to ring 33. Ring groove band 34 is also provided with an inclined expansion compensating surface 38 and fits with inside radial clearance with respect to the piston body; such inside radial clearance precluding binding of the band against the body of the piston when the parts of the piston expand under operating temperatures to which the piston may be subjected. The band is held in position by threaded securing or locking ring 39, which is held against rotation by tapered pins 41. Blow-by minimizing channels 42 are preferably provided directly in the body of the piston in the upper sides of the grooves for the lower compression rings 43, although they may be omitted if so desired.

The following figures are given by way of example to indicate some of the more important dimensions in the piston of Figs. 9 and 10. Such piston has an outside diameter of about four and one-quarter inches (4¼ in.), and a length of about six and one-eighth inches (6⅛ in.). As is customary practice, the upper ring belt portion 21 of the piston, wherein are located the compression ring grooves, and usually a lower oil ring groove, is of slightly less diameter than the lower part of the piston because when hot, such belt portion 21 being near the hotter portion of the piston, namely the crown, expands more; and it is desirable to have a substantially uniform running fit of the piston with its cylinder wall, along its entire length, when the piston is working under operating temperatures in the cylinder.

The cylinder wall clearance at belt portion 21 is in the order of seventeen one-thousandths (.017) to nineteen one-thousandths (.019) of an inch when the parts are cold, with the piston centered exactly in the cylinder. Ring 33 is designed to have only extremely slight clearance between the upper and lower sides of its seating groove, which is in the order of fifteen ten thousandths (.0015) to twenty-five ten thousandths (.0025) of an inch with the parts cold. Blow-by minimizing channel 36 is in the order of ten one-thousandths (.010) to twelve one-thousandths (.012) of an inch in height, and has a radial depth, usually of about twenty-five (25) to fifty (50) per cent of the radial thickness of the ring itself. In the embodiment of the piston illustrated, such radial depth of the channel is about one-sixteenth (1/16) of an inch, while the radial thickness of the ring 33 is approximately three-sixteenths (3/16) of an inch. The clearance space behind the ring is in the order of twenty-eight one thousandths (.028) to forty one-thousandths (.040) of an inch, when the parts are cold and the piston is in the cylinder. The carbon removing member 37 is of such height that when the piston ring rests on the lower side of its seating groove, the member is just free of contact with the upper surface of the channel 36; so as not to scrape against such surface as rotational movement of the ring with respect to the piston occurs, and thereby avoid interference to such movement. As previously explained, the described dimensions are not critical but may vary widely, depending upon conditions to be met and the size and character of the piston, and are only by way of example to indicate the relative magnitude thereof.

Fig. 11 illustrates a modified form of construction substantially similar to that of Figs. 9 and 10, but in which ring groove band 44 is not formed with the inclined expansion compensating surface, and is retained in position by securing ring 46 shrunk over the upper peripheral portion of the piston instead of being screwed thereto.

I claim:

1. A piston arrangement comprising a piston having a peripheral piston ring groove, and a substantially uninterrupted peripheral channel in the upper side of said groove to minimize blow-by; and a piston ring adapted to seat in said groove and having a member adapted to project into said channel and during relative movement between said ring and said piston remove carbon from said channel to maintain it open.

2. A piston ring adapted to seat in a piston ring groove having a blow-by minimizing channel in the upper side thereof, comprising a member adapted to project into said channel and during relative movement between said ring and said piston ring groove remove carbon from said channel to maintain it open.

3. A piston arrangement comprising a piston having a peripheral piston ring groove, the sides of which are substantially parallel and substantially at a right angle with respect to the axis of said piston, and a substantially uninterrupted peripheral channel in the upper side of said groove for minimizing blow-by, said channel being substantially rectangularly shaped in cross-section; and a piston ring adapted to seat in said groove, said ring being substantially rectangularly shaped in cross-section and having substantially parallel sides substantially at a right angle with respect to the axis of said piston whereby sealing contact may occur between the upper sides of said ring and groove as well as the lower sides thereof, and a member on the upper side of said ring for projecting into said channel to remove carbon from said channel during relative movement between said ring and said piston.

OSCAR L. STARR.